US012027337B2

(12) United States Patent
Kim

(10) Patent No.: US 12,027,337 B2
(45) Date of Patent: Jul. 2, 2024

(54) FUSE DESIGN

(71) Applicant: Littelfuse, Inc., Chicago, IL (US)

(72) Inventor: Young Tae Kim, Seoul (KR)

(73) Assignee: Littelfuse, Inc., Chicago, IL (US)

( * ) Notice: Subject to any disclaimer, the term of this patent is extended or adjusted under 35 U.S.C. 154(b) by 9 days.

(21) Appl. No.: 18/153,815

(22) Filed: Jan. 12, 2023

(65) Prior Publication Data

US 2023/0230791 A1 Jul. 20, 2023

Related U.S. Application Data

(60) Provisional application No. 63/300,422, filed on Jan. 18, 2022.

(51) Int. Cl.

| | |
|---|---|
| ***H01H 85/43*** | (2006.01) |
| ***H01H 85/02*** | (2006.01) |
| ***H01H 85/143*** | (2006.01) |
| ***H01H 85/175*** | (2006.01) |
| *H01H 85/20* | (2006.01) |

(52) U.S. Cl.

CPC ...... *H01H 85/0241* (2013.01); *H01H 85/143* (2013.01); *H01H 85/175* (2013.01); *H01H 85/43* (2013.01); *H01H 2085/0275* (2013.01); *H01H 2085/2085* (2013.01); *H01H 2207/032* (2013.01)

(58) Field of Classification Search

CPC ............. H01H 85/0241; H01H 85/143; H01H 85/175; H01H 2085/0275; H01H 2085/2085; H01H 2207/032; H01H 2085/0412; H01H 2085/0414; H01H 85/43

See application file for complete search history.

(56) References Cited

U.S. PATENT DOCUMENTS

| | | | | | |
|---|---|---|---|---|---|
| 5,179,436 | A * | 1/1993 | Asdollahi | H01H 85/0417 | 337/203 |
| 5,304,974 | A * | 4/1994 | Denton | H01H 61/02 | 337/5 |
| 2010/0328020 | A1 * | 12/2010 | Wiryana | H01H 85/175 | 337/232 |
| 2016/0372294 | A1 * | 12/2016 | Nan | H01H 85/175 | |
| 2018/0294126 | A1 * | 10/2018 | de Leon | H01H 85/175 | |
| 2019/0259556 | A1 * | 8/2019 | Schlaak | H01H 85/43 | |
| 2022/0301794 | A1 * | 9/2022 | Kimura | H01M 50/296 | |
| 2023/0097062 | A1 * | 3/2023 | Kuwahara | H01H 85/17 | 337/187 |

* cited by examiner

*Primary Examiner* — Jacob R Crum

(74) *Attorney, Agent, or Firm* — KDW FIRM PLLC

(57) ABSTRACT

A fuse assembly includes a fuse element, a first terminal, a second terminal, a socket, and a capsule. The fuse element is disposed between first and second end bells. The first terminal includes a first bell portion, a first socket portion, and a first capsule portion, the first bell portion being connected to the first end bell. The second terminal includes a second bell portion, a second socket portion, and a second capsule portion, the second bell portion being connected to the second end bell. The first socket portion and the second socket portion are integrated through the socket. The first capsule portion and the second capsule portion are integrated through the capsule. The socket is seated atop the capsule to create an interior chamber inside which the fuse element is disposed.

15 Claims, 12 Drawing Sheets

FUSE DESIGN

CROSS REFERENCE TO RELATED APPLICATION

This application claims the benefit of priority to, U.S. Provisional Patent Application No. 63/300,422, filed Jan. 18, 2022, entitled "NOVEL FUSE DESIGN," which application is incorporated herein by reference in its entirety.

FIELD OF THE DISCLOSURE

Embodiments of the present disclosure relate to fuses and, more particularly, to elements of fuse housing.

BACKGROUND

Used in electrical systems to protect against excessive current, fuses are sacrificial devices which break when an overcurrent condition occurs. Fuses include a fuse element, such as a metal wire or strip, that links two metal contact terminals together, and which melts/breaks if too much current flow. The breakage causes an open circuit, thus protecting devices to which the fuse is connected. Fuses come in a variety of shapes and sizes and have many applications, from small circuit electronics to large-scale industrial applications.

The fuse may also have a housing, such as a socket connected to terminals for holding the fuse element and a cap to cover the fuse element. When the fuse breaks, an arc energy is created between its terminals, causing the metal of the fuse element, as well as other materials, to melt and deposit within the fuse housing.

There may be instances in which the cap blows off due to the overcurrent event. Due to this housing defect, the fuse may receive a lower rating than as otherwise designed. The blown fuse event may also be quite noisy, especially where the cap blows off.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a fuse assembly in accordance with the present disclosure may include a fuse element, a first terminal, a second terminal, a socket, and a capsule. The fuse element is disposed between first and second end bells. The first terminal includes a first bell portion, a first socket portion, and a first capsule portion, the first bell portion being connected to the first end bell. The second terminal includes a second bell portion, a second socket portion, and a second capsule portion, the second bell portion being connected to the second end bell. The first socket portion and the second socket portion are integrated through the socket. The first capsule portion and the second capsule portion are integrated through the capsule. The socket is seated atop the capsule to create an interior chamber inside which the fuse element is disposed.

Another exemplary embodiment of a fuse assembly in accordance with the present disclosure may include a capsule, a socket, and first and second terminals. The capsule includes a first inside surface disposed between first and second capsule terminal regions. The first inside surface includes capsule wedges. The socket includes a second inside surface with socket wedges and is located on the capsule to form an interior chamber. The capsule wedges are on a first side of the interior chamber and the socket wedges are on a second side of the interior chamber, the first side being opposite the second side. The first and second terminals are connected between a fuse element, which is inside the interior chamber. Each terminal includes a first portion integrated with the capsule and a second portion integrated with the socket.

DETAILED DESCRIPTION

A novel fuse assembly is disclosed herein. The fuse assembly includes a fuse element in a chamber surrounded by a socket and a capsule. In contrast to legacy fuse assemblies, the capsule is located on the bottom of the fuse assembly, with the socket being on the top. The terminals are shaped so as to be integrated with both the socket and the capsule. The socket and the capsule have surfaces that are wedged for increased surface area in the chamber. The wedges provide surfaces to which outgassing debris can attach and provide noise mitigation during breakage of the fuse element. The socket also includes an exhaust port having multiple pathways for exit of outgassing debris and for noise mitigation.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components disclosed herein, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1:
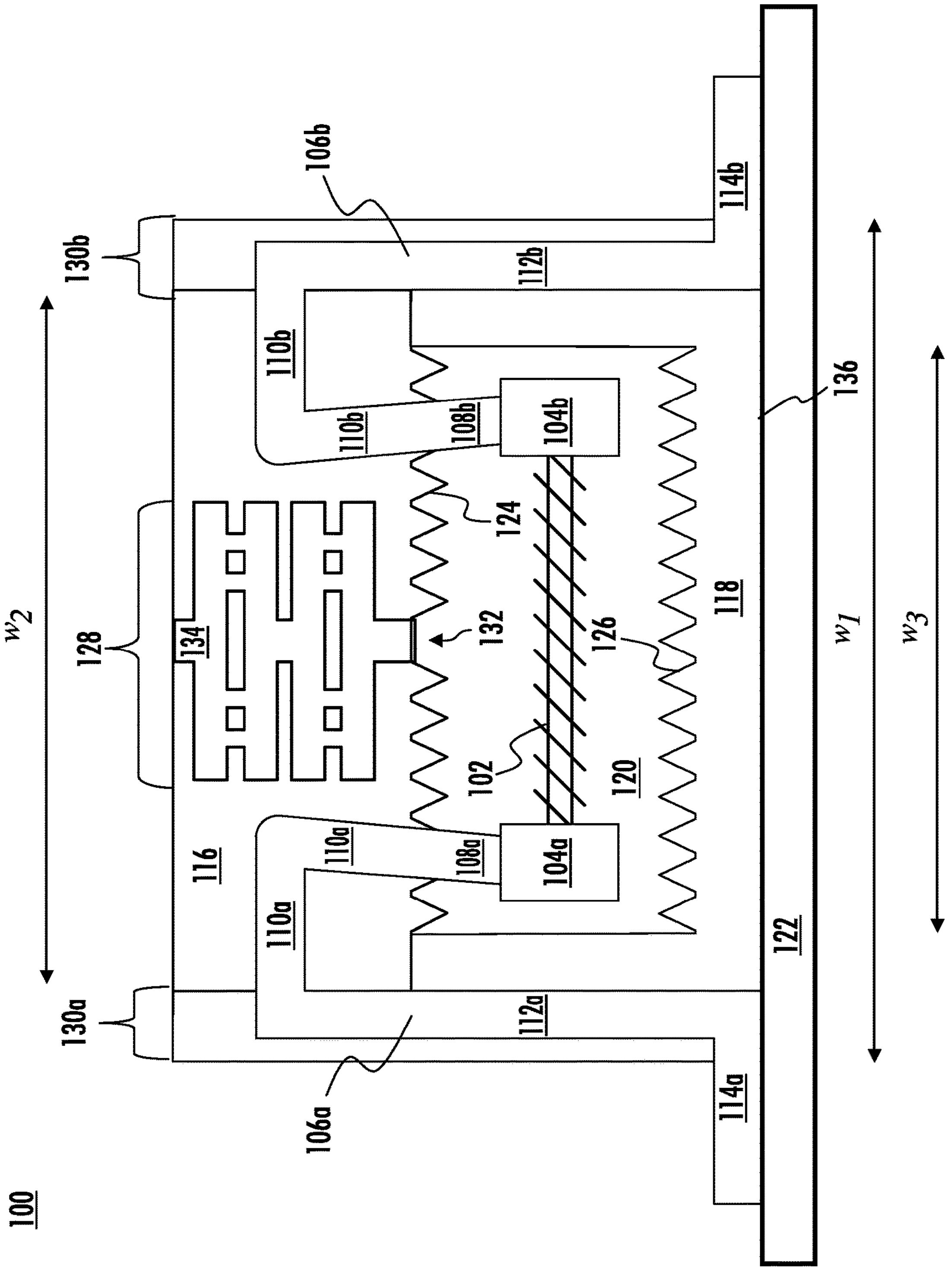
FIG. 1 is a diagram illustrating a surface mount technology fuse assembly, in accordance with exemplary embodiments.

FIG. 1 is a representative drawing of a fuse assembly 100 for providing overcurrent protection, according to exemplary embodiments. The novel fuse assembly 100 includes several features designed to improve performance over legacy fuses. The fuse assembly 100 is designed for surface mount technology (SMT), in exemplary embodiments. SMT enables a device having terminals to be mounted to a printed circuit board (PCB) by soldering the terminals of the device directly to the PCB. SMT technology is contrasted with through hole technology (THT), in which holes are drilled through the PCB and terminals of the device are inserted through the holes in the PCB.

The fuse assembly 100 includes a fuse element 102 within an interior chamber 120 and disposed between two end bells 104*a* and 104*b* (collectively, "end bells 104"). Each end bell 104 is connected to a respective terminal: end bell 104*a* is connected to terminal 106*a* and end bell 104*b* is connected to terminal 106*b* (collectively, "terminals 106"). Because the fuse assembly 100 is an SMT device, each terminal 106 include respective SMT portions: terminal 106*a* includes SMT portion 114*a* and terminal 106*b* includes SMT portion 114*b* (collectively, "SMT portions 114"). The SMT portions 114 are to be soldered to a PCB 122.

The fuse assembly 100 features housing for the fuse element 102 consisting of a socket 116 and a capsule 118. In exemplary embodiments and in contrast to legacy fuses, the socket 116 is at a location remote from the PCB 122 (e.g., at the top portion of the fuse assembly 100 in FIG. 1) while the capsule 118 is at a location close to the PCB (e.g., at the bottom portion of the fuse assembly 100 in FIG. 1). In addition to the SMT portions 114 of the terminals 106 being in contact with the PCB 122, the capsule 118 is also in contact with the PCB, in one embodiment. In exemplary embodiments, by reversing the relative locations of the capsule 118 and socket 116, the capsule will stay intact following an overcurrent event.

The terminals 106 are shaped to fit with the housing elements, the socket 116 and the capsule 118. In exemplary embodiments, each terminal 106 includes four separate portions for fitting with the housing elements. Terminal 106*a* includes a bell connection portion 108*a*, a socket connection portion 110*a*, a capsule portion 112*a*, and the already introduced SMT portion 114*a*; likewise, terminal 106*b* includes a bell portion 108*b*, a socket portion 110*b*, a capsule portion 112*b*, and the SMT portion 114*b* (collectively, "bell portions 108", "socket portions 110", and "capsule portions 112"). In exemplary embodiments, the socket 116 and the capsule 118 are made of a non-conductive material, such as plastic.

The bell portions 108 of the terminals 106 connect between respective end bells 104 and one end of respective socket portions 110, with the other end of socket portions being connected to respective capsule portions 112 at one end, with the other end of capsule portions being connected to respective SMT portions 114. In exemplary embodiments, the socket portions 110 are bent inside the socket 116 while the end bell portions 108 are somewhat parallel to the capsule portions 112, with the capsule portions being perpendicular to the socket and SMT portions. The terminals 106 are thus snake-like in configuration, in some embodiments. In exemplary embodiments, the capsule portions 112 are integrated with the capsule 118 and the socket portions 110 are integrated with the socket 116 of the fuse assembly 100. Capsule terminal regions 130*a* and 130*b* are the parts of the capsule 118 into which respective capsule portions 112 of the terminals 106 are disposed (collectively, "capsule terminal regions 130").

In exemplary embodiments, socket wedges 124 are disposed on an inside surface of the socket 116 such that they are in the interior chamber 120 of the fuse assembly 100. Likewise, capsule wedges 126 are disposed on an inside surface of the capsule 118 such that they are in the interior chamber 120 of the fuse assembly 100. In exemplary embodiments, the socket wedges 124 are disposed on one side of the fuse element 102 while the capsule wedges 126 are disposed on the other side of the fuse element. In FIG. 1, the socket wedges 124 are above the fuse element 102 while the capsule wedges 126 are below the fuse element. In exemplary embodiments, the socket wedges 124 and the capsule wedges 126 are designed to muffle the explosive sound that occurs when the fuse element 102 breaks in response to an overcurrent event. In exemplary embodiments, the socket wedges 124 and the capsule wedges 126 further provide an increased surface area of the interior chamber 120 to which exhaust materials consisting both of solids and gases, can attach.

In exemplary embodiments, the fuse assembly 100 also features an exhaust port 128 built into the socket 116. In exemplary embodiments, the exhaust port 128 is disposed between an inside surface of the socket 116 and an outside surface of the socket, where the inside surface is in the interior chamber 120. The exhaust port 128 provides a pathway for release of gasses and debris material away from the interior chamber 120 resulting from the breakage of the fuse element 102. The exhaust port 128 includes an entrance 132 in the interior chamber 120, providing a pathway for the exhausted materials, and an exit 134 located at an exterior surface of the socket 116.

In exemplary embodiments, the capsule 118 is substantially u-shaped, with an outside surface 136 (the surface opposite the capsule wedges 126) to be placed against the surface of the PCB 122. The socket 116 sits atop the capsule 118 to form the closed interior chamber 120. The capsule 118, including the capsule terminal regions 130, has a first width, $w_1$, while the socket 116 has a second width, $w_2$. The width of the interior of the capsule 118, that is, the distance (horizontal distance in FIG. 1) between the capsule terminal regions 130, is a third width, $w_3$. In exemplary embodiments, $w_1 > w_2 > w_3$.

Figure 2:
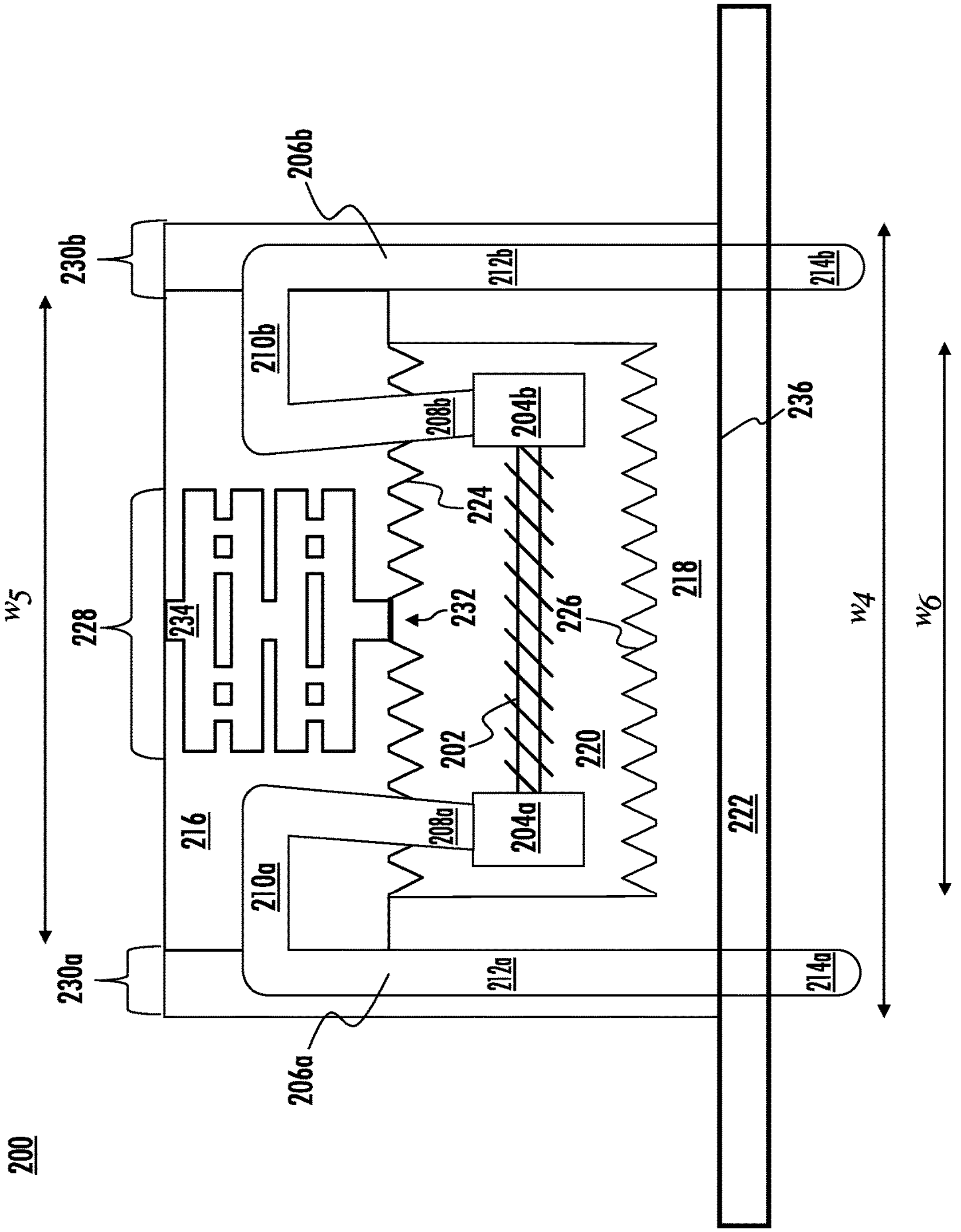
FIG. 2 is a diagram illustrating a through hole technology fuse assembly, in accordance with exemplary embodiments.

FIG. 2 is a representative drawing of a fuse assembly 200 for providing overcurrent protection, according to exemplary embodiments. Like the fuse assembly 100, the novel fuse assembly 200 includes several features designed to improve performance over legacy fuses. The fuse assembly 200 is designed for through hole technology (THT), in exemplary embodiments, in which holes are drilled through the PCB and terminals of the fuse assembly are inserted through the holes in the PCB.

The fuse assembly 200 includes a fuse element 202 within an interior chamber 220 and disposed between two end bells 204*a* and 204*b* (collectively, "end bells 204"). Each end bell 204 is connected to a respective terminal: end bell 204*a* is connected to terminal 206*a* and end bell 204*b* is connected to terminal 206*b* (collectively, "terminals 206"). Because the fuse assembly 200 is a THT device, each terminal 206 include respective THT portions: terminal 206*a* includes THT portion 214*a* and terminal 206*b* includes THT portion 214*b* (collectively, "THT portions 214"). The THT portions 214 are to be inserted through dedicated holes drilled through a PCB 222 and soldered to the PCB on the side opposite the fuse assembly 200.

The fuse assembly 200 features housing for the fuse element 202 consisting of a socket 216 and a capsule 218. In exemplary embodiments and in contrast to legacy fuses, the socket 216 is at a location remote from the PCB 222 (e.g., at the top portion of the fuse assembly 200 in FIG. 2)

while the capsule 218 is at a location close to the PCB (e.g., at the bottom portion of the fuse assembly 200 in FIG. 2). In addition to the THT portions 214 of the terminals 206 being in contact with (e.g., disposed through) the PCB 222, the capsule 218 is also in contact with the PCB, in one embodiment. In exemplary embodiments, by reversing the relative locations of the capsule 218 and socket 216, the capsule will stay intact following an overcurrent event.

The terminals 206 are shaped to fit with the housing elements, the socket 216 and the capsule 218. In exemplary embodiments, each terminal 206 includes four separate portions for fitting with the housing elements. Terminal 206*a* includes a bell connection portion 208*a*, a socket connection portion 210*a*, a capsule portion 212*a*, and the already introduced THT portion 214*a*; likewise, terminal 206*b* includes a bell portion 208*b*, a socket portion 210*b*, a capsule portion 212*b*, and the THT portion 214*b* (collectively, "bell portions 208", "socket portions 210", and "capsule portions 212"). In exemplary embodiments, the socket 216 and the capsule 218 are made of a non-conductive material, such as plastic.

The bell portions 208 of the terminals 206 connect between respective end bells 204 and one end of respective socket portions 210, with the other end of socket portions being connected to respective capsule portions 212 at one end, with the other end of capsule portions being connected to respective THT portions 214. In exemplary embodiments, the capsule portions 212 are substantially lined up with respective THT portions 214 while the end bell portions 208 are somewhat parallel to the capsule portions 212, with the capsule portions being perpendicular to the socket portions 210. The terminals 206 are thus snake-like in configuration, in some embodiments. In exemplary embodiments, the capsule portions 212 are integrated with the capsule 218 and the socket portions 210, which are bent, are integrated with the socket 216 of the fuse assembly 200. Capsule terminal regions 230*a* and 230*b* are the parts of the capsule 218 into which respective capsule portions 212 of the terminals 206 are disposed (collectively, "capsule terminal regions 230").

In exemplary embodiments, socket wedges 224 are disposed on an inside surface of the socket 216 such that they are in the interior chamber 220 of the fuse assembly 200. Likewise, capsule wedges 226 are disposed on an inside surface of the capsule 218 such that they are in the interior chamber 220 of the fuse assembly 200. In exemplary embodiments, the socket wedges 224 are disposed on one side of the fuse element 202 while the capsule wedges 226 are disposed on the other side of the fuse element. In FIG. 2, the socket wedges 224 are above the fuse element 202 while the capsule wedges 226 are below the fuse element. In exemplary embodiments, the socket wedges 224 and the capsule wedges 226 are designed to muffle the explosive sound that occurs when the fuse element 202 breaks in response to an overcurrent event. In exemplary embodiments, the socket wedges 224 and the capsule wedges 226 further provide an increased surface area of the interior chamber 220 to which exhaust materials consisting both of solids and gases, can attach.

In exemplary embodiments, the fuse assembly 200 also features an exhaust port 228 built into the socket 216. In exemplary embodiments, the exhaust port 228 is disposed between an inside surface of the socket 216 and an outside surface of the socket, where the inside surface is in the interior chamber 220. The exhaust port 228 provides a pathway for release of gasses and debris material away from the interior chamber 220 resulting from the breakage of the fuse element 202. The exhaust port 228 includes an entrance 232 in the interior chamber 220, providing a pathway for the exhausted materials, and an exit 234 located at an exterior surface of the socket 216.

In exemplary embodiments, the capsule 218 is substantially u-shaped, with an outside surface 236 (the surface opposite the capsule wedges 226) to be placed against the surface of the PCB 222. The socket 216 sits atop the capsule 218 to form the closed interior chamber 220. The capsule 218, including the capsule terminal regions 230, has a first width, $w_4$, while the socket 216 has a second width, $w_5$. The width of the interior of the capsule 218, that is, the distance (horizontal distance in FIG. 1) between the capsule terminal regions 230, is a third width, $w_6$. In exemplary embodiments, $w_4 > w_5 > w_6$.

When a fuse is broken, due to an overcurrent condition, hot gases are created by the sudden appearance of an arc. The suddenly increased air temperature, hot gases, and molten material create a significant pressure increase (shock wave) inside the fuse housing that will try to exit the housing very quickly, if possible. The molten material results from the breaking of the fuse element or the heating of the fuse terminals or other conductive material nearby. The plastic material of the socket 116/216 and capsule 118/218, when exposed to these same violent gases, will turn into carbon, which is semi-conductive. The resulting explosion of outgassing materials inside the fuse is thus a combination of hot gases, molten materials, and carbonized plastic materials.

The fuse may operate without vents, such that all the outgassing material stays within the housing of the fuse. This may be preferred in some environments where the messy aftereffects of the blown fuse are to be avoided. However, all molten material (from the copper element to the housing walls) will stay in the fuse. If there is an opening somewhere in the fuse housing, the outgassing will exit at the opening and the gases will transport molten and vaporized copper and carbonized semi-conductive plastic materials of the housing to locations external to the fuse housing.

So, while some outgassing is acceptable (and even unavoidable) when the fuse breaks, the outgassing of the fuse should be reduced or controlled as much as possible. The socket wedges, 124/224, capsule wedges 126/226, and exhaust port 128/228 of the fuse assemblies 100/200 are designed to strategically control the outgas sing that occurs when the fuse breaks such that the rating of the fuse remains very high. The socket wedges 124/224 and capsule wedges 126/226 provide additional surface area in the interior chamber 120/220 to which the outgassing material can stick. The exhaust port 128/228 provides a serpentine path for the outgassing to flow out of the fuse assembly 100/200.

Figure 3A:
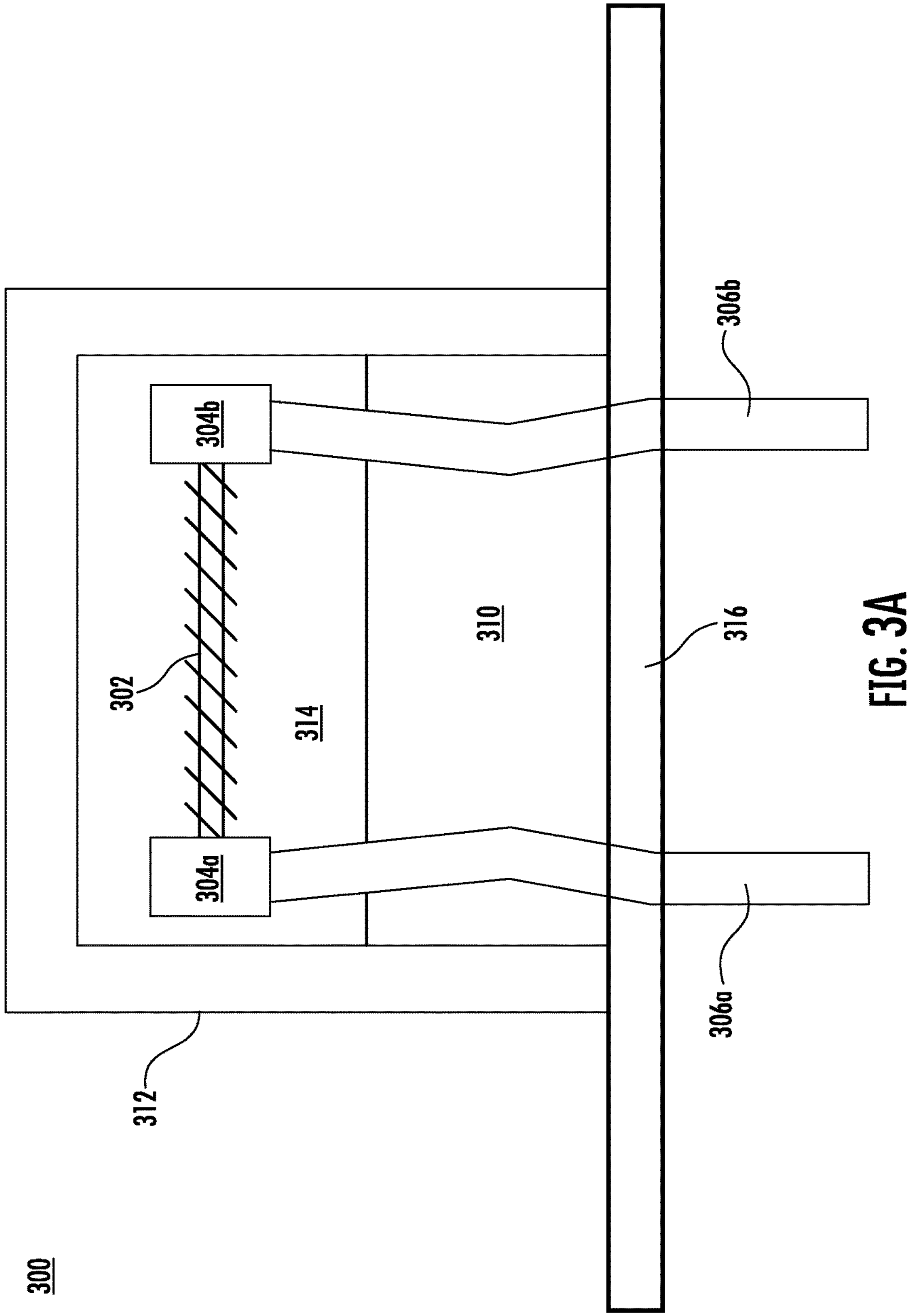
FIG. 3A (PRIOR ART)
FIGS. 3A-3C are diagrams illustrating a fuse assembly, in accordance with the prior art.
Figure 3C:
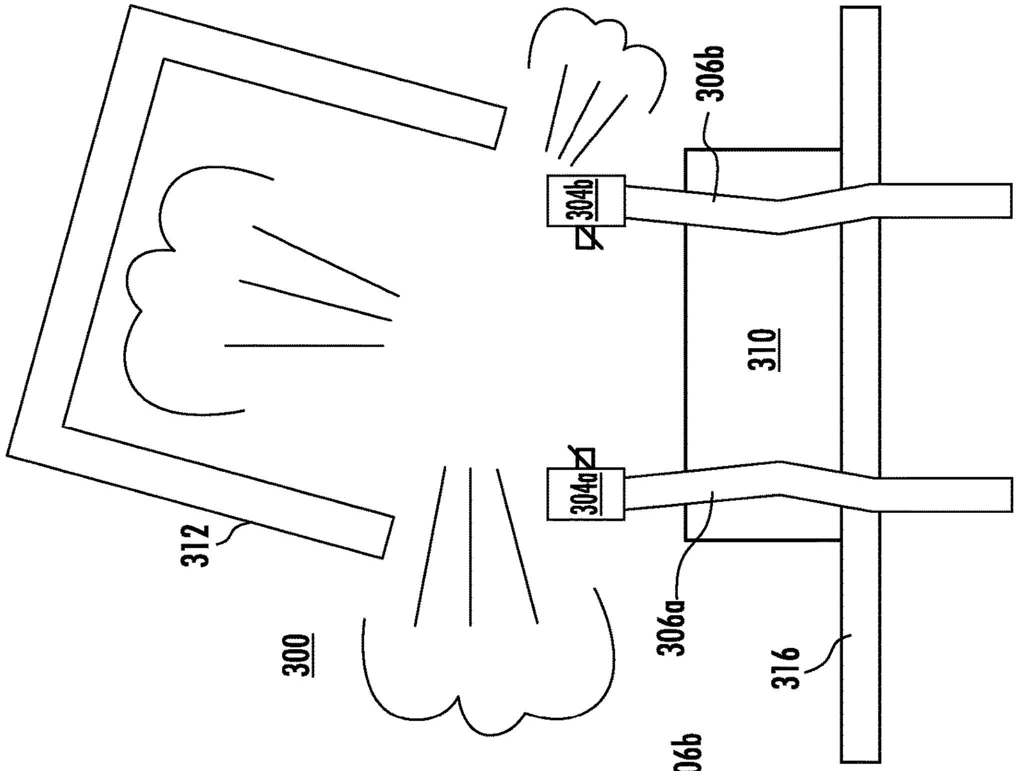
FIG. 3C (PRIOR ART)
Figure 3B:
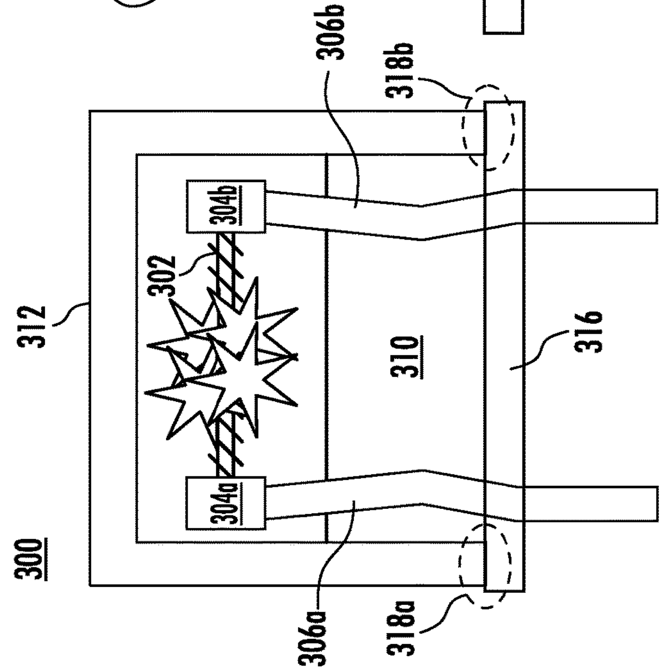
FIG. 3B (PRIOR ART)

FIGS. 3A-3C are representative drawings of a fuse assembly 300, according to the prior art. FIG. 3A illustrates the fuse assembly 300 in a stable state; in FIG. 3B, an overcurrent event has occurred; and in FIG. 3C, the fuse assembly housing has been compromised. The fuse assembly 300 is a THT-type of fuse. Like the novel fuse assemblies 100 and 200 described above, the fuse assembly 300 features a fuse element 302 disposed between two end bells 304*a* and 304*b* (collectively, "end bells 304"). Terminals are attached to respective end bells, with terminal 306*a* being attached to end bell 304*a* and terminal 306*b* being attached to end bell 304*b* (collectively, "terminals 306"). A socket 310 and a capsule 312 form a housing of the fuse assembly 300, with the fuse element 302 being disposed in an interior chamber 314 formed by the socket and capsule.

In contrast to the fuse assemblies 100 and 200, the socket 310 of the fuse assembly 300 is disposed near a PCB 316 (e.g., at the bottom portion of the fuse assembly 300 in the illustrations), while the capsule 312 is at a location farther away from the PCB (e.g., at the top portion of the fuse assembly 300 in the illustrations). While the socket 310 is in proximity to the PCB 316 along one surface, the capsule 312 is proximate the PCB at join regions 318*a* and 318*b* (collectively, "join regions 318"), as shown in FIG. 3B. As a THT-type fuse, the fuse assembly 300 is bound to the PCB 316 by the terminals 306 being soldered to a backside of the PCB (e.g., the side opposite the location of the fuse assembly), with the capsule 312 not typically being soldered to the PCB. The binding power is not sufficient to keep the capsule in place during an overcurrent event. Thus, as illustrated in FIG. 3C, the capsule 312 may separate from the socket 310 of the fuse assembly 300, resulting in a debris field of gasses and solid materials, as described above, on the PCB 316. In addition to being messy, the debris field, which may include materials having some electrical conductivity, may cause problems with other circuitry connected to the PCB 316. Additionally, the explosion caused by the breakage of the fuse element 302 inside fuse assembly 300 and the thrust of the capsule 312 away from the fuse assembly will be noisy.

In exemplary embodiments, the features of the fuse assemblies 100 and 200 solve the deficiencies of the legacy fuse assembly 300. By reversing the disposition of the socket 116/216 and the capsule 118/218, the capsule is not able to be thrust away from the fuse assembly. Further, the serpentine shape of the terminals 106/206, in which the socket portion 110/210 is integrated with the socket 116/216, the capsule portion 112/212 is integrated with the capsule 118, and the terminals are soldered onto the PCB (whether SMT or THT), ensures that the capsule and socket remain in place once the fuse element breaks. The socket wedges 124/224 and capsule wedges 126/226 disposed in the interior chamber 120/220 provide mitigation of explosive noise, in exemplary embodiments, as well an increased surface area for receipt of debris. The exhaust port 128/228 provides a serpentine pathway for the travel of debris, which both prevents conductive material from remaining in the interior chamber 120/220 and provides another soundproofing or sound-mitigating mechanism, in exemplary embodiments.

Figure 4B:
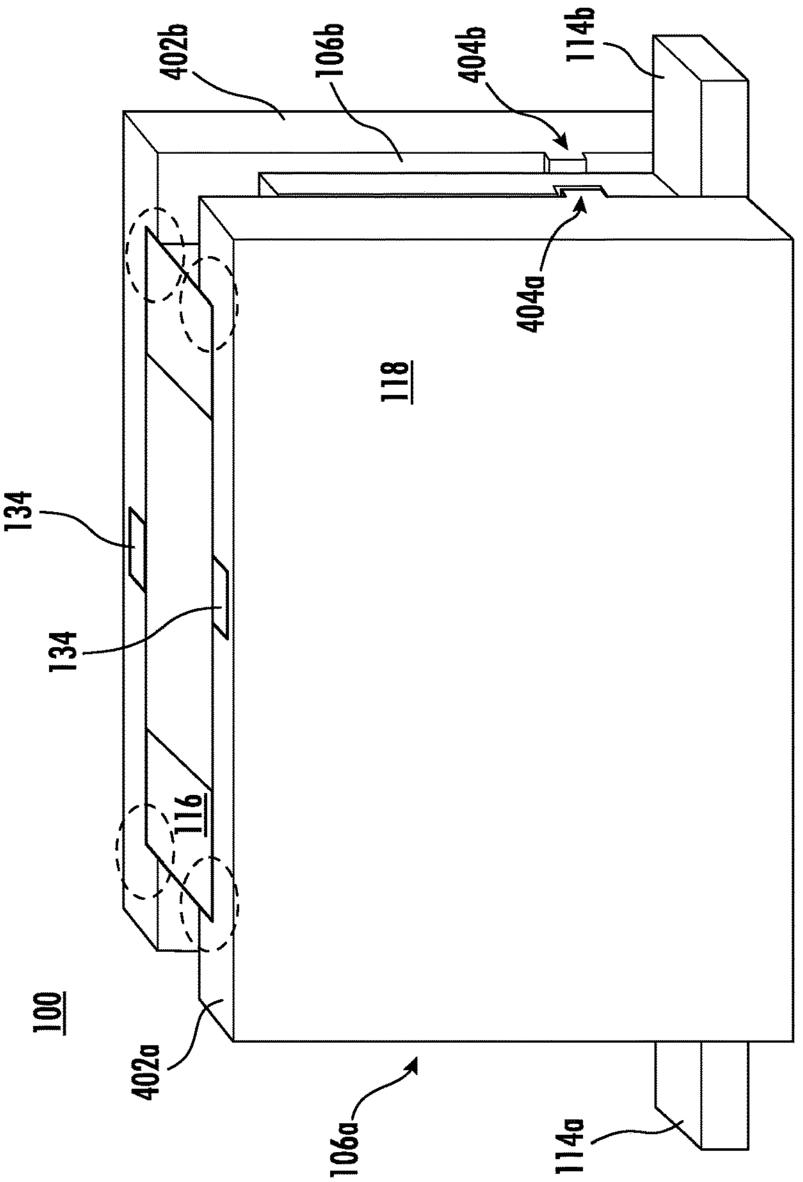
FIGS. 4A-4D are diagrams illustrating the fuse assembly of FIG. 1, in accordance with exemplary embodiments.
Figure 4A:
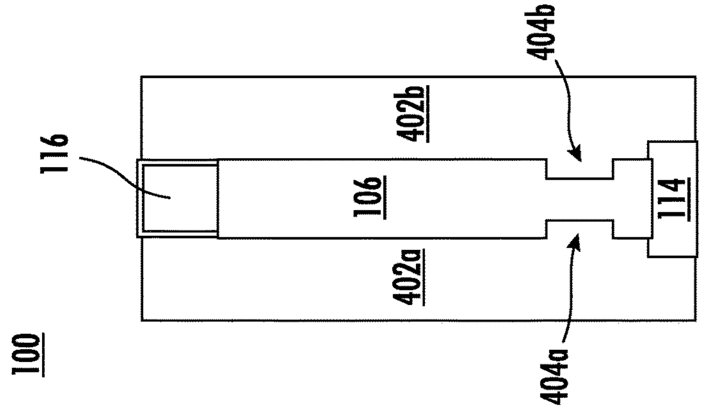
Figure 4D:
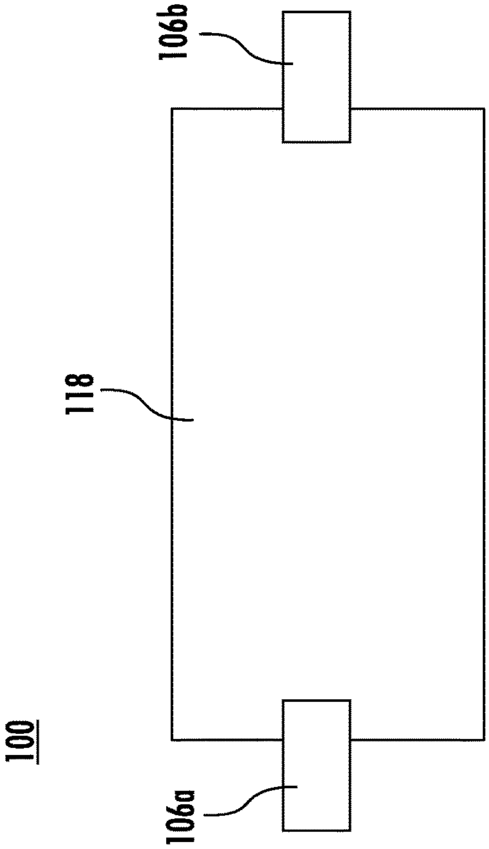
Figure 4C:
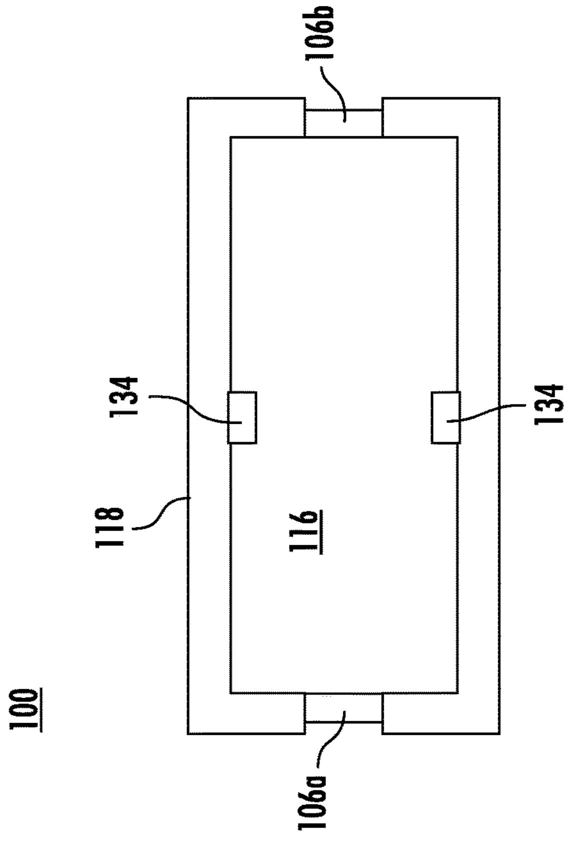

FIGS. 4A-4D are representative drawings of the fuse assembly 100 of FIG. 1, according to exemplary embodiments. FIG. 4A is a side view of the fuse assembly 100; FIG. 4B is a perspective view of the fuse assembly; FIG. 4C is a top view of the fuse assembly; and FIG. 4D is a bottom view of the fuse assembly. The socket 116 and capsule 118, which make up the housing of the fuse assembly 100, are shown. The capsule 118 includes two separate capsule sections 402*a* and 402*b* (collectively, "capsule sections 402"), disposed on either side of the socket 116, whereas the illustration of FIG. 1 shows only one capsule section, thus exposing the fuse element 102, the end bells 104, and the serpentine shape of the terminals 106. The SMT portion 114 of terminals 106 are also shown.

In exemplary embodiments, each capsule section 402 features a projection: capsule section 402*a* includes projection 404*a* and capsule section 402*b* includes projection 404*b* (collectively, "projections 404"). As the terminals 114 are soldered onto the PCB, the capsule 118 will be strongly fixed in place by the soldered terminals. In exemplary embodiments, the projections 404 further prevent the terminal 106 from moving inside the fuse assembly 100. The white dashed circles at the top of FIG. 4B show that the top of the socket 116 overlaps the two capsule sections 402*a* and 402*b*. Thus, the socket 116 is held in place and does not move. Further, the terminals 106 are thinner than the socket 116, so the socket helps prevent movement of the terminals. The perspective view of FIG. 4B and the top view of FIG. 4C also show two exits 134 for the exhaust port 128 (see FIG. 1), in exemplary embodiments.

Figure 5B:
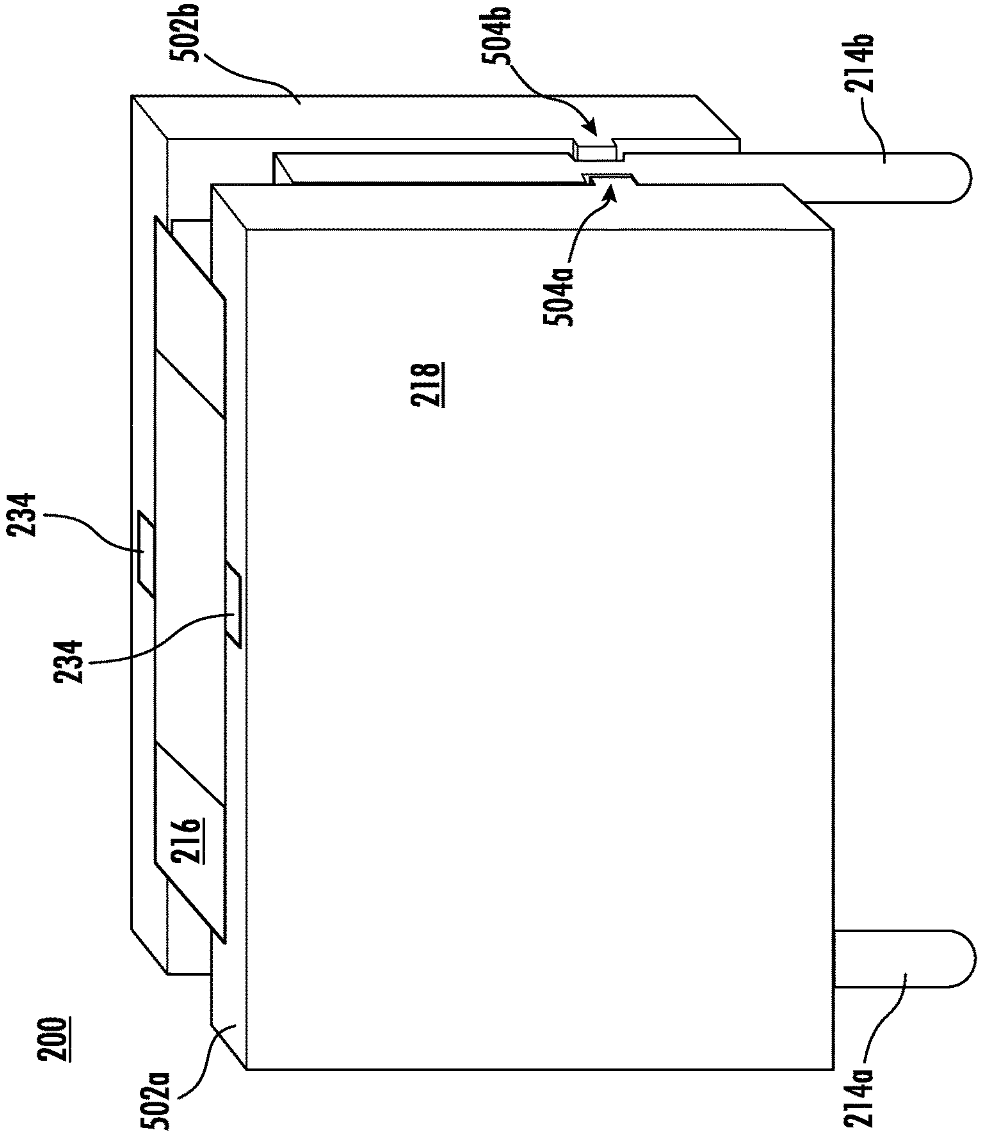
FIGS. 5A-5D are diagrams illustrating the fuse assembly of FIG. 2, in accordance with exemplary embodiments.
Figure 5A:
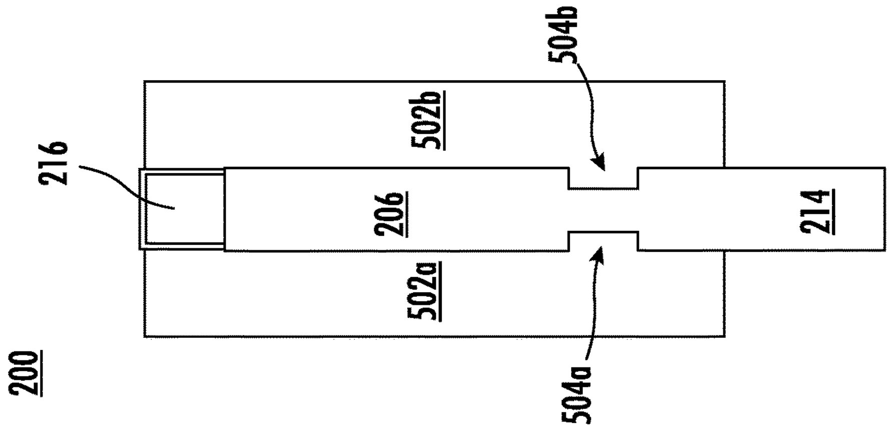
Figure 5D:
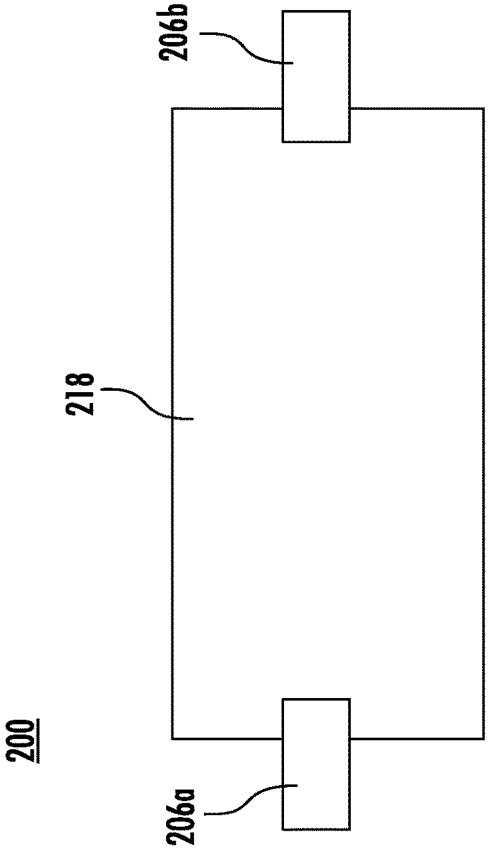
Figure 5C:
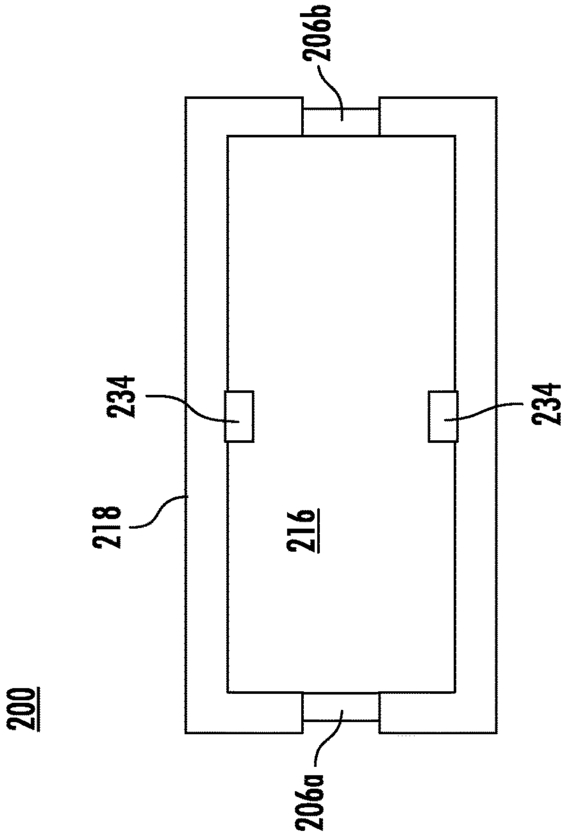

FIGS. 5A-5D are representative drawings of the fuse assembly 200 of FIG. 2, according to exemplary embodiments. FIG. 5A is a side view of the fuse assembly 200; FIG. 5B is a perspective view of the fuse assembly; FIG. 5C is a top view of the fuse assembly; and FIG. 5D is a bottom view of the fuse assembly. The socket 216 and capsule 218, which make up the housing of the fuse assembly 200, are shown. The capsule 218 includes two separate capsule sections 502*a* and 502*b* (collectively, "capsule sections 502"), disposed on either side of the socket 216, whereas the illustration of FIG. 2 shows only one capsule section, thus exposing the fuse element 202, the end bells 204, and the serpentine shape of the terminals 206. The THT portion 214 of terminals 206 are also shown.

In exemplary embodiments, each capsule section 502 features a projection: capsule section 502*a* includes projection 504*a* and capsule section 502*b* includes projection 504*b* (collectively, "projections 504"). As the terminals 206 are affixed to the PCB using through-hole technology, the capsule 218 will be strongly fixed in place by the terminals. In exemplary embodiments, the projections 504 further prevent the terminal 206 from moving inside the fuse assembly 200. As with the fuse assembly 100 (FIG. 4B), FIG. 5B show that the top of the socket 216 overlaps the two capsule sections 502*a* and 502*b*. Thus, the socket 216 is held in place and does not move. Further, the terminals 206 are thinner than the socket 216, so the socket helps prevent movement of the terminals. The perspective view of FIG. 5B and the top view of FIG. 5C also show two exits 234 for the exhaust port 228 (see FIG. 2), in exemplary embodiments.

Figure 6A:
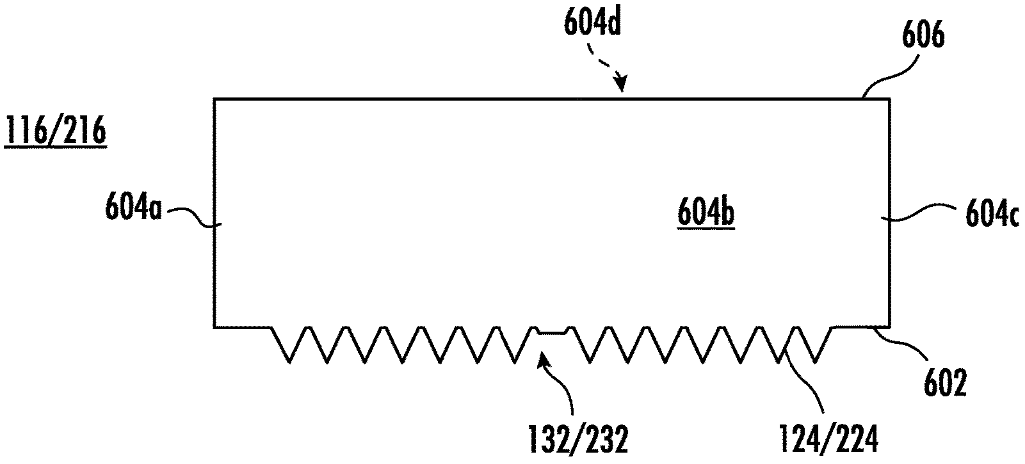
FIGS. 6A and 6B are diagrams illustrating the socket for the fuse assemblies of FIGS. 1 and 2, in accordance with exemplary embodiments.
Figure 6B:
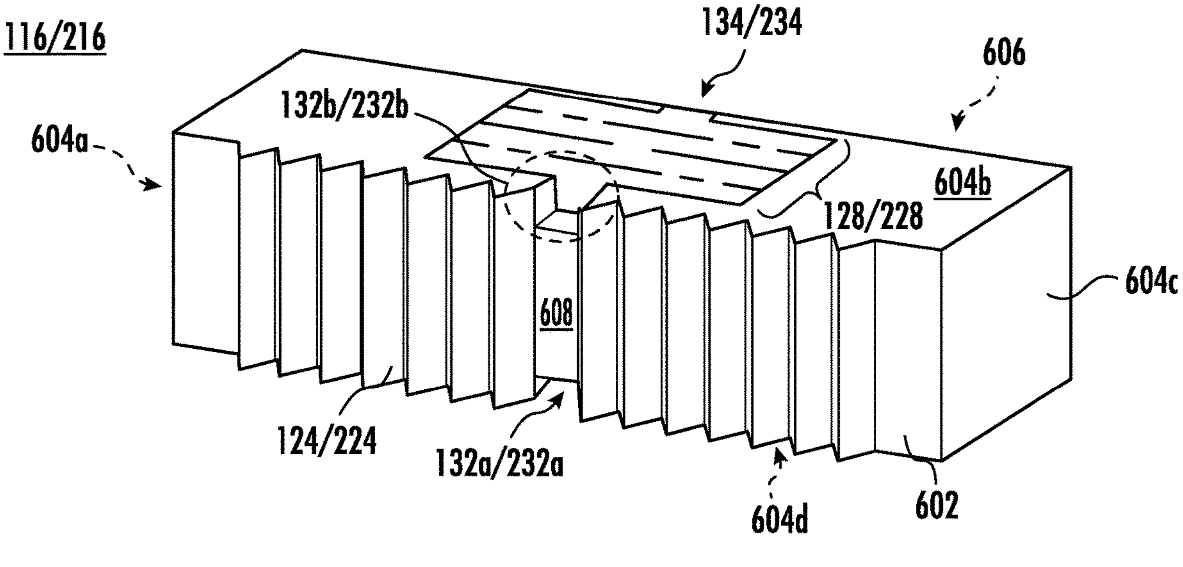

FIGS. 6A and 6B are representative drawings of the socket for the fuse assemblies 100 and 200 of FIGS. 1 and 2, respectively, according to exemplary embodiments. FIG. 6A is a side view of socket 116/216; and FIG. 6B is a perspective view of the socket. The socket wedges 124/224 of the socket 116/216 are shown, as before.

The socket 116/216 is substantially rectangular cube-shaped having six sides, in exemplary embodiments, with inside surface 602 featuring the socket wedges 124/224. The inside surface 602 forms one surface of the interior chamber 120/220 (FIG. 1/FIG. 2) while an outside surface 606 features the exit 134/234 of the exhaust ports 128/228. There are also four side surfaces 604*a-d*, with side surfaces 604*a* and 604*c* being opposite and parallel to one another and side surfaces 604*b* and 604*d* also being opposite and parallel to one another, and perpendicular to side surfaces 604*a* and 604*c* (collectively, "side surfaces 604"). The side surfaces 604*a* and 604*c* are flush against the capsule terminal regions 130/230 once the socket 116/216 is engaged with the capsule 118/218.

Exhaust ports 128/228, including the entrance 132/232 and exit 134/234 are also shown in FIG. 6B. In exemplary embodiments, a bridge 608 divides the entrance 132/232 into two parts, 132*a*/232*a* and 132*b*/232*b* (shown at the bottom of the socket). The bridge 608 thus creates two paths for outgassing of debris from the interior chamber of the fuse assemblies 100/200.

Figure 7A:
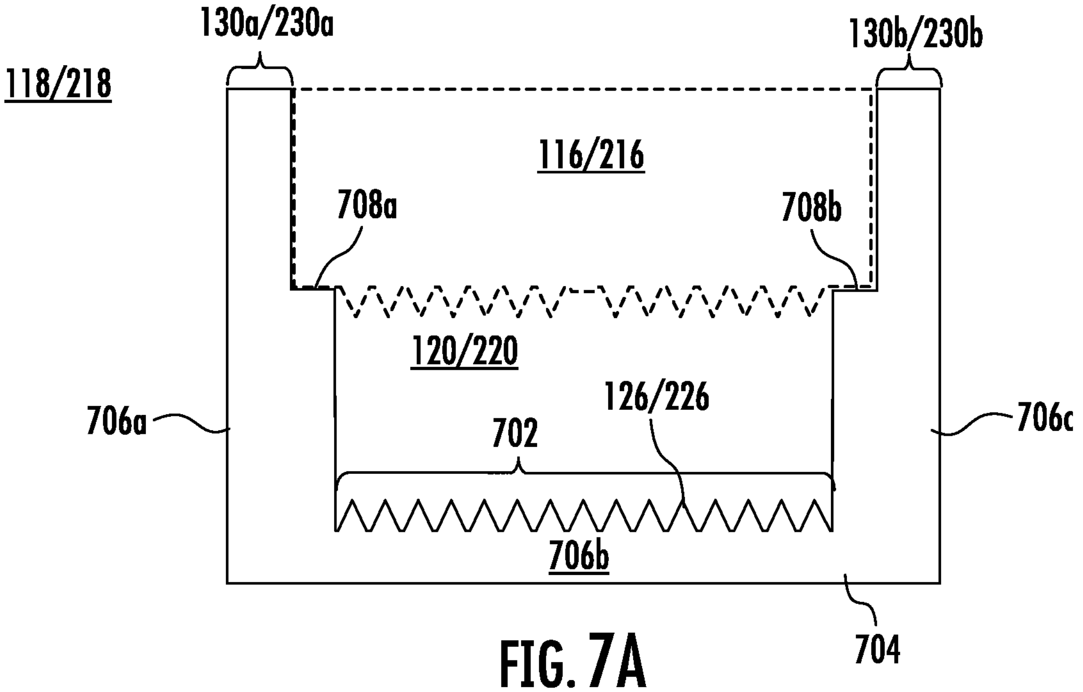
FIGS. 7A and 7B are diagrams illustrating the capsule for the fuse assemblies of FIGS. 1 and 2, in accordance with exemplary embodiments.
Figure 7B:
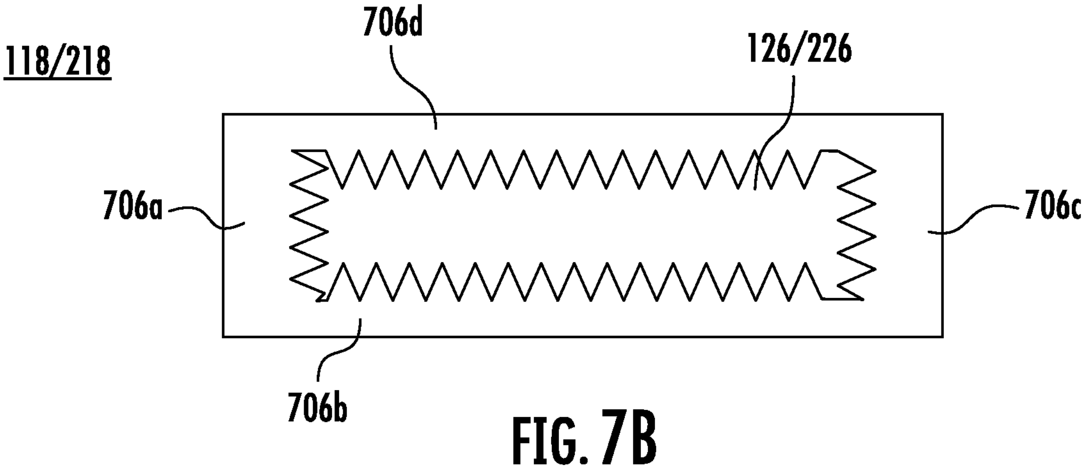

FIGS. 7A and 7B are representative drawings of the capsule for fuse assemblies 100 and 200 of FIGS. 1 and 2, respectively, according to exemplary embodiments. FIG. 7A is a side view of the capsule 118/218; and FIG. 7B is a bird's eye view of the capsule.

The capsule 118/218 is a generally u-shaped structure having an inside surface 702 which is populated with the capsule wedges 126/226. The capsule wedges 126/226 provide both 1) increased surface area for catching debris once the fuse element breaks and 2) a mechanism to muffle or mitigate the explosive sounds resulting from the breakage. Opposite the inside surface 702, a PCB attach surface 704 is the part of the housing of the fuse assembly 100/200 that contacts the PCB. Side surfaces 706*a*, 706*b*, 706*c*, and 706*d* surround the inside surface 702 with the capsule wedges 126/226 (collectively, "side surfaces 706"), as shown in FIG. 7B.

The capsule terminal regions 130/230 introduced in FIGS. 1 and 2 are shown in FIG. 7A. The capsule terminal regions 130/230 house the integrated capsule portions 112/212 of the terminals 106/206. Adjacent to the capsule terminal regions 130/230 and the capsule wedges 126/226 are two socket seats: socket seat 708*a* is disposed between capsule terminal region 130*a*/230*a* and the wedges 126/226 and socket seat 708*b* is disposed between capsule terminal region 130*b*/230*b* and the wedges (collectively, "socket seats 708"). The socket seats 708 provide a surface on which the socket 116/216 is placed, such that the interior chamber 120/220 is formed.

Figure 8B:
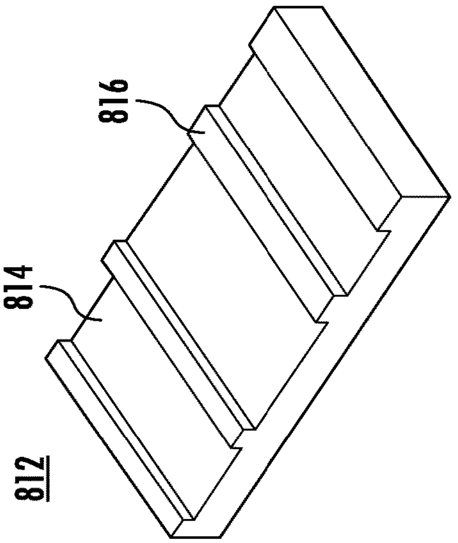
FIGS. 8A and 8B are diagrams illustrating the exhaust port for the fuse assemblies of FIGS. 1 and 2, in accordance with exemplary embodiments.
Figure 8A:
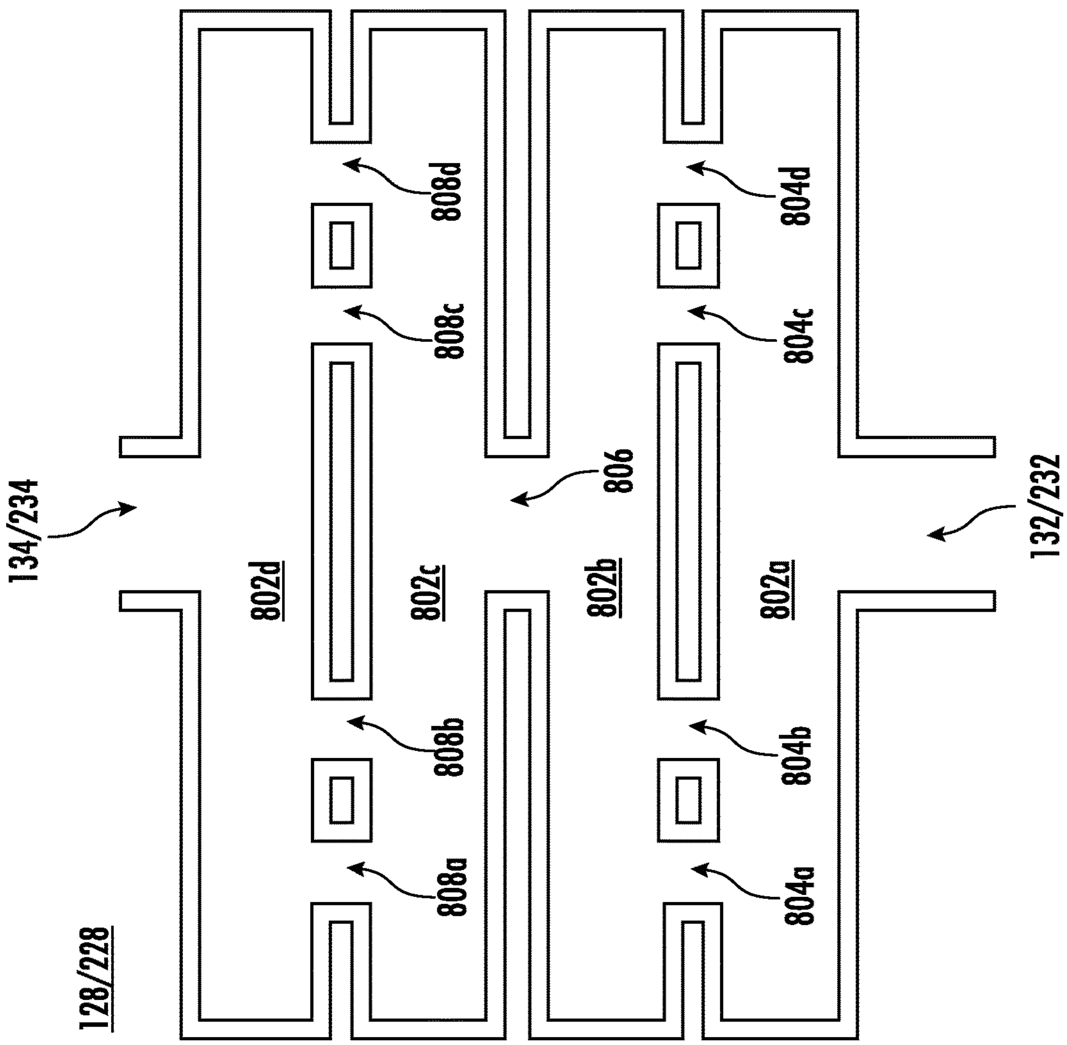

FIGS. 8A and 8B are representative drawings of the exhaust port for fuse assemblies 100 and 200 of FIGS. 1 and 2, respectively, according to exemplary embodiments. FIG. 8A is a side view of the exhaust port 128/228; and FIG. 8B is a perspective view of a wall portion 812 of the exhaust port, including the wall 814 and the intaglio surface 816. These illustrations are provided with reference also to FIGS. 1, 2, and 6B. Already introduced exhaust port entrance 132/232 and exit 134/234 are shown. Recall that the entrance 132/232 may have two parts, 132*a*/232*a* and 132*b*/232*b*, with the bridge 608 therebetween (FIG. 6B), which provides dual paths for debris to exit the interior chamber 120/220.

FIG. 8A provides a more detailed view of the exhaust port 128/228. In exemplary embodiments, the exhaust port 128/228 features chambers 802*a*, 802*b*, 802*c*, and 802*d* (collectively, "chambers 802"), which are orthogonal to the entrance 132/232 and exit 134/234. The chambers 802 are parallel to one another, with chamber 802*a* being closest to the entrance 132/232, chamber 802*b* being adjacent to chamber 802*a*, chamber 802*c* being adjacent to chamber 802*b*, and chamber 802*d* being adjacent to chamber 802*c* and closest to the exit 134/234. Although four pathways are shown, the exhaust port 128/228 may be more or fewer pathways.

The exhaust port 128/228 further includes several pathways which are perpendicular to the chambers 802. First pathways 804*a*, 804*b*, 804*c*, and 804*d* are disposed between chambers 802*a* and 802*b*; second pathway 806 is disposed between chambers 802*b* and 802*c*; and third pathways 808*a*, 808*b*, 808*c*, and 808*d* are disposed between chambers 802*c* and 802*d* (collectively, "first pathways 804" and "third pathways 808"). Although four pathways 804 are disposed between chambers 802 and 802*b* and four pathways 808 are disposed between chambers 802*c* and 802*d*, the number of pathways may be larger or smaller. Similarly, although one pathway 806 is disposed between chambers 802*b* and 802*c*, the exhaust port 128/228 may be designed with a larger number of pathways between the chambers. In exemplary embodiments, the exhaust port 128/228 is designed to provide multiple pathways for outgassing of debris from the interior chamber 120/220 of the fuse assembly 100/200.

Off-gassing debris leaving the interior chamber 120/220 of the fuse assembly 100/200 would first enter chamber 802*a*, then enter chamber 802*b*, then chamber 802*c*, and finally chamber 802*d*, before reaching exit 134/234. The exhaust port 128/228 is designed to provide multiple paths for egress of the explosive debris, as well as many surfaces to which some of the debris may attach. As compared to a cylindrical tube, the exhaust port 128/228 provides an increased surface area, which also mitigates the noise caused by the fuse element explosion, in exemplary embodiments.

Figure 9A:
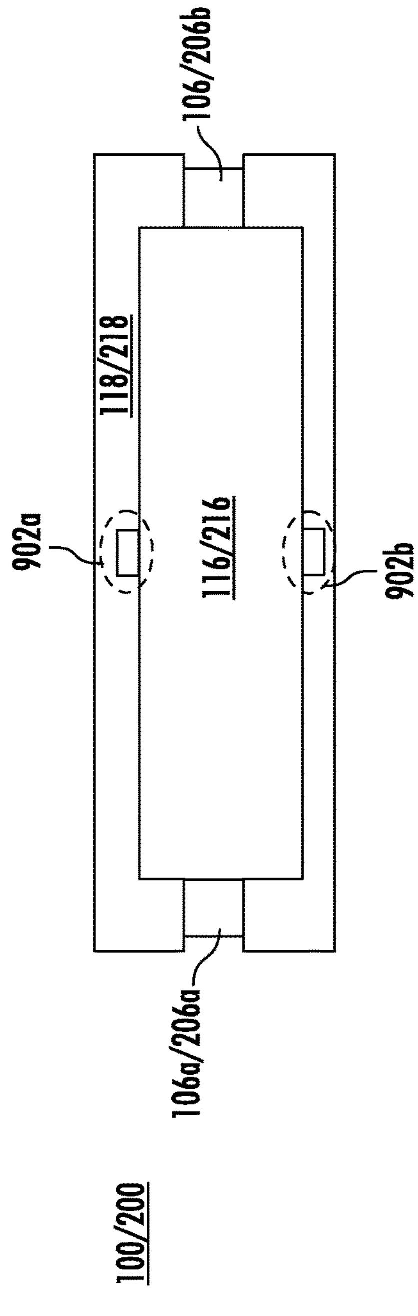
FIGS. 9A and 9B are diagrams illustrating the fuse assemblies of FIGS. 1 and 2, in accordance with exemplary embodiments.
Figure 9B:
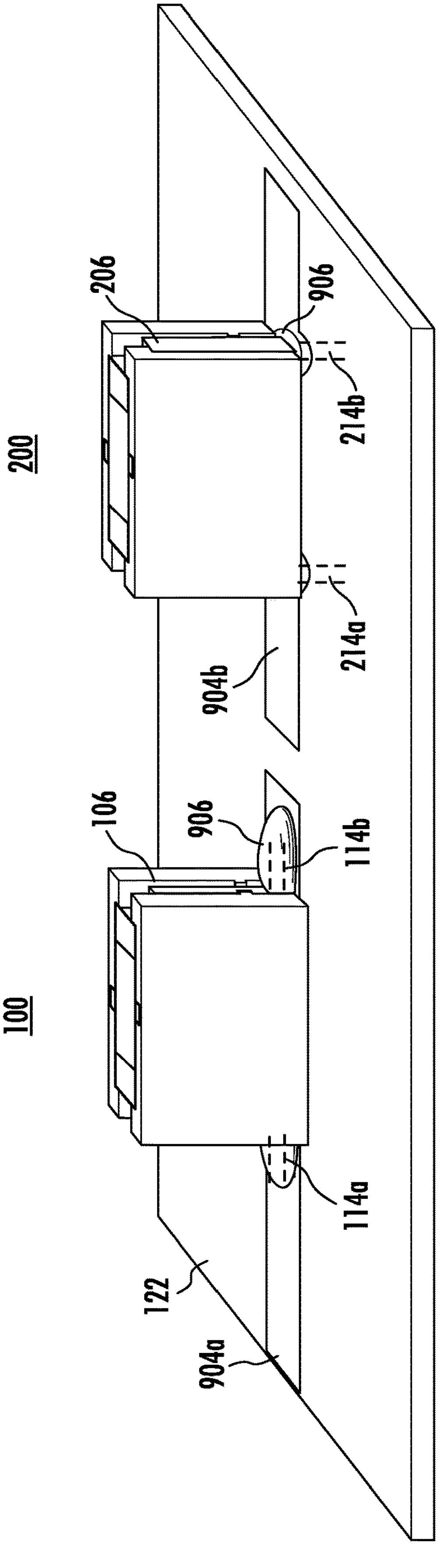

FIGS. 9A and 9B are representative drawings of the fuse assemblies 100 and 200 of FIGS. 1 and 2, respectively, according to exemplary embodiments. FIG. 9A is a bird's eye view of the fuse assemblies 100/200; and FIG. 9B is a perspective view of fuse assembly 100 and fuse assembly 200 disposed on the PCB 122. FIG. 9A shows the socket 116/216 surrounded by the capsule 118/218, with socket projections 902*a* and 902*b*. Recall from FIGS. 4B and 5B that the capsule 118 has two capsule sections 402*a* and 402*b* and the capsule 218 has two capsule sections 502*a* and 502*b*. The two capsule sections surround the socket 116/216 but are spaced apart enough that the terminals 106/206 are visible.

In FIG. 9B, both the fuse assembly 100 and the fuse assembly 200 are soldered onto the PCB 122. Copper pad 904*a* is used to electrically connect to the terminals 106 of fuse assembly 100; and copper pad 904*b* is used to electrically connect to the terminals 206 of fuse assembly 200 (collectively, "copper pads 904"). The SMT portions 114 of terminals 106 of the fuse assembly 100 are attached to the copper pad 904*a* using soldering paste 906. The THT portions 214 of terminals 206 of the fuse assembly 200 are inserted through holes in the PCB 122 (not shown) and attached to the backside of the PCB, also using soldering paste (not shown). The features of the fuse assemblies 100 and 200 are thus available for both SMT- and THT-type attachment to the PCB, in exemplary embodiments.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations, and changes to the described embodiments are possible without departing from the sphere and scope of the present disclosure, as defined in the appended claims. Accordingly, it is intended that the present disclosure not be limited to the described embodiments, but that it has the full scope defined by the language of the following claims, and equivalents thereof.

The invention claimed is:

1. A fuse assembly comprising:

a fuse element coupled between a first end bell and a second end bell;

a first terminal comprising a first bell portion, a first socket portion, and a first capsule portion, wherein the first bell portion is coupled to the first end bell;

a second terminal comprising a second bell portion, a second socket portion, and a second capsule portion, wherein the second bell portion is coupled to the second end bell;

a socket through which the first socket portion and the second socket portion are integrated, the socket comprising an exhaust port disposed between an inside surface of the socket and an outside surface of the socket and providing a plurality of pathways therebetween, the exhaust port providing a pathway for outgassing of debris in response to the fuse element breaking, the exhaust port comprising:

an entrance at the inside surface of the socket;

an exit at the outside surface of the socket; and a plurality of chambers disposed between the entrance and the exit, the plurality of chambers being perpendicular to the plurality of pathways; and a capsule through which the first capsule portion and the second capsule portion are integrated;

wherein the socket is seated atop the capsule to create an interior chamber inside which the fuse element is disposed.

2. The fuse assembly of claim 1, the capsule further comprising an outside surface located between the first terminal and the second terminal, wherein the outside surface is to be placed on a printed circuit board (PCB).

3. The fuse assembly of claim 2, the first terminal further comprising a first surface mount technology (SMT) portion and the second terminal further comprising a second SMT portion, wherein the first SMT portion and the second SMT portion are soldered to the PCB.

4. The fuse assembly of claim 2, the first terminal further comprising a first through hole technology (THT) portion and the second terminal further comprising a second THT portion, wherein the first THT portion is fed through a first hole in the PCB and the second THT portion is fed through a second hole in the PCB and the first THT port and the second THT portion are soldered to the PCB.

5. The fuse assembly of claim 1, the socket further comprising socket wedges disposed on an inside surface of the socket, wherein the socket wedges are disposed in the interior chamber.

6. The fuse assembly of claim 5, the capsule further comprising capsule wedges disposed on an inside surface of the capsule, wherein the capsule wedges are disposed in the interior chamber, wherein the socket wedges are on a first side of the fuse element and the capsule wedges are on a second side of the fuse element, the second side being opposite the first side.

7. The fuse assembly of claim 1, wherein the capsule has a first width, and the socket has a second width, the first width being larger than the second width.

8. The fuse assembly of claim 1, the capsule further comprising:

a first section comprising a first projection; and a second section comprising a second projection, wherein the first projection and the second projection hold the first terminal and the second terminal in place.

9. A fuse assembly comprising:

a capsule comprising a first inside surface disposed between a first capsule terminal region and a second capsule terminal region, the first inside surface comprising capsule wedges;

a socket comprising a second inside surface, the second inside surface comprising socket wedges, wherein the socket is disposed on the capsule to form an interior chamber, the capsule wedges being on a first side of the interior chamber and the socket wedges being on a second side of the interior chamber, wherein the first side is opposite the second side, the socket further comprising an exhaust port comprising a plurality of pathways from the interior chamber to an outside surface of the socket, the exhaust port providing a pathway for outgassing of debris in response to the fuse element breaking, the exhaust port further comprising:

an entrance leading from the interior chamber;

an exit at the outside surface; and a plurality of chambers disposed between the entrance and the exit, the plurality of chambers being perpendicular to the plurality of pathways; and first and second terminals connecting between a fuse element, the fuse element being in the interior chamber, each terminal comprising a first portion integrated with the capsule and a second portion integrated with the socket.

10. The fuse assembly of claim 9, wherein the socket is rectangular cube shaped.

11. The fuse assembly of claim 9, the first and second terminals each further comprising a surface mount technology (SMT) portion to be soldered to a printed circuit board (PCB).

12. The fuse assembly of claim 9, the first and second terminals each further comprising a through hole technology (THT) portion to be inserted through dedicated holes in a printed circuit board (PCB), wherein the THT portions are soldered to the PCB.

13. The fuse assembly of claim 9, the capsule further comprising a pair of socket seats upon which the socket is disposed to form the interior chamber.

14. The fuse assembly of claim 9, the capsule further comprising:

a first section comprising a first projection; and a second section comprising a second projection, wherein the first projection and the second projection hold the first terminal and the second terminal in place.

15. The fuse assembly of claim 9, wherein the capsule has a first width, and the socket has a second width, the first width being larger than the second width.

* * * * *